US00RE34419E

United States Patent [19]

Melvin et al.

[11] E Patent Number: Re. 34,419

[45] Reissued Date of Patent: Oct. 26, 1993

[54] METHOD TO [DIMILITARIZE] *DEMILITARIZE*, EXTRACT, AND RECOVER AMMONIUM PERCHLORATE FROM COMPOSITE PROPELLANTS USING LIQUID AMMONIA

[75] Inventors: William S. Melvin, Huntsville; James F. Graham, Decatur, both of Ala.

[73] Assignee: The United States of America as represented by the Secretary of the Army, Washington, D.C.

[21] Appl. No.: 542,625

[22] Filed: Jun. 25, 1990

Related U.S. Patent Documents

Reissue of:

[64] Patent No.: 4,854,982
Issued: Aug. 8, 1989
Appl. No.: 296,557
Filed: Jan. 31, 1989

[51] Int. Cl.[5] ..... D03D 23/00

[52] U.S. Cl. ..... 149/109.6; 149/76; 149/124; 423/476

[58] Field of Search ..... 149/124, 109.6, 76; 423/426

[56] References Cited

U.S. PATENT DOCUMENTS

| | | | |
|---|---|---|---|
| H305 | 7/1987 | Mitchell et al. | 556/143 |
| 3,928,546 | 12/1975 | Guzzo | 149/76 |
| 4,057,442 | 11/1977 | Shaw et al. | 149/109.4 |
| 4,198,209 | 4/1980 | Frosch et al. | 149/108.4 |
| 4,376,666 | 3/1983 | Williams, Jr. | 149/109.6 |
| 4,662,893 | 5/1987 | McIntosh | 23/293 R |

OTHER PUBLICATIONS

SIR H305, Porter H. Mitchell and William S. Melvin, "Demilitarization of High Burn Rate Propellants Containing Ferrocene or its Derivatives", Jul. 7, 1987.

Brown, E. D., "Propellant Removal by Water Washout (Hydromining)", CPIA Pub. No. 436, 1985, JANNAF Safety and Environmental Protection Subcommittee Meeting, pp. 99-103, Nov. 1985.

Poulter, L. W., Brown, J. L., Hammond, W. E., McIntosh, M. J., "Solid Propellant Ingredient Reclamation", CPIA Pub. No. 408, 1984 JANNAF Safety and Environmental Protection Subcommitte Meeting, pp. 149-158, May 1986.

Amster, A. B., and McBride, W. R., "Sensitivity and Characterization of Selected Liquid Ammonia Systems", NWC TP 5836, Oct.-Dec. 1975.

Amster, A. B., and McBride, W. R., "Sensitivity and Characterization of Selected Liquid Ammonia Systems", NWC TP 5961, Mar. 1977.

*Primary Examiner*—Donald P. Walsh
*Assistant Examiner*—Ngocwan T. Mai
*Attorney, Agent, or Firm*—Freddie M. Bush

[57] ABSTRACT

Liquid ammonia is maintained at the required operating conditions to efficiently and rapidly achieve propellant demilitarization including recovery of ammonia perchlorate (AP) for reuse, by an environmentally safe method to comminute and remove propellant from existing rocket motor hardware. The method is also applicable to both solid and ground composite propellant which includes scrap or waste propellant. A disclosed demilitarization unit employed in the ammonium perchlorate recovery method is comprised of a supply and high pressure spray system for liquid ammonia, an extraction system, oxidizer recovery system, and an ammonia recovery, drying,* and recycling system. The method is workable at ambient temperature since ammonia is liquified under its own vapor pressure at 114 psig; however, increased temperature further enhances the extraction efficiency of the system. Solubilized ammonium perchlorate is separated after a phase change takes place through a liquid-gas expansion nozzle which provides a direct method to "automatically precipitate and chemically grind" so to speak, the solid oxidizer AP particles to a predetermined, uniform size and configuration in accordance with established, solute purification techniques based on various temperature, pressure, and liquid nozzle spray conditions for particle size control when precipitated from a solvent. This method results in the rapid fall out of AP from liquid ammonia during the phase change or gasification stage since AP is insoluble in gaseous ammonia.

9 Claims, 2 Drawing Sheets

METHOD TO [DIMILITARIZE] *DEMILITARIZE,* EXTRACT, AND RECOVER AMMONIUM PERCHLORATE FROM COMPOSITE PROPELLANTS USING LIQUID AMMONIA

Matter enclosed in heavy brackets [ ] appears in the original patent but forms no part of this reissue specification; matter printed in italics indicates the additions made by reissue.

DEDICATORY CLAUSE

The invention described herein may be manufactured, used, and licensed by or for the Government for governmental purposes without the payment to us of any royalties thereon.

BACKGROUND OF THE INVENTION

The demilitarization and disposal of surplus and reject propellants, explosives, and energetic materials has been a requirement over the years. The most commonly employed method of disposal involves open burning and open destruction (OB/OD) of hazardous munitions and ingredients. Large scale reclamation of specific ingredients from propellants and warheads has been pursued only when the manufacturing cost or strategic importance of a particular ingredient was sufficiently high to justify the added recovery expenses. For example, U.S. Pat. No. 4,376,666 disclosed a cost effective method to recover n-hexylcarborane (NHC) from solid rocket propellants at a cost of only a fraction of its manufacturing costs. This method, although cost effective for the reason stated, resulted in diverting a major amount of remaining propellant ingredients to waste for ultimate disposal using traditional approaches.

Recent Environmental Protection Agency (EPA) restrictions limiting OB/OD of hazardous wastes and munitions poses an enormous problem which touches all phases of the propulsion industry. Civilian directed Government agencies, such as NASA, and all of the military organizations and their DoD contractors are now experiencing the impact of these new regulations. Developments in the Intermediate-Range Nuclear Forces (INF) arms negotiations have underscored the urgency to identify acceptable methods to demilitarize large rocket motors. Conventional means of destruction, such as launch-to-destroy, static firing or open burning, present extreme environmental sensitivities. Demilitarization methods, which can meet the new EPA regulations, are not currently available. The most widely discussed alternative to current OB/OD methods involves the use of water-jet propellant cutting followed by oxidizer solvation and reclamation using a traditional solvent extraction system.

Attempts to extract, recover, and recycle ammonium perchlorate oxidizer from large amounts of water effluents associated with large motor demilitarizations have also proved uneconomical, and the technology has not been reduced to industrial practice. Energy costs associated with water effluent treatments and ammonium perchlorate recrystallization are too great in comparison to the less than $1 cost per pound of commercial grade ammonium perchlorate.

The propulsion industry would welcome a method to demilitarize, extract, and recover propellant ingredients as well as to recover miscellaneous rocket motor hardware for recycling. The method should be one which is adaptable for recycling the material used to demilitarize, extract and recover propellant. The method would be particularly attractive if recovery of the propellant ingredients and hardware results in a return of high economic value to the system while minimizing any adverse effect to the environment.

An innovative method for propellant demilitarization, reclamation, and hazardous waste minimization that takes advantage of the "gas-to-liquid" and "liquid-to-gas" phase transition, which can occur during the compression and expansion of all gases, would have distinct advantages over existing methods. Specifically, a gas when pressurized to its liquified state and functions as a nontraditional liquid solvent would be highly desirable in a method to demilitarize, extract, and recover the major ingredient from composite propellants. The use of a nontraditional liquid solvent with a demonstrated solvating capability for the extraction of ammonium perchlorate oxidizer, the major ingredient in nearly all large solid rocket motors, represents a radical departure from the OB/OD and water-based removal-/extraction methods currently employed or proposed by cognizant personnel associated with demilitarizing rocket motors and other munitions. An added benefit of utilizing a liquidified gas as an extraction solvent, as described in this disclosure, is that the demilitarization process can be nonpolluting, inexpensive, and environmentally acceptable.

Therefore, an object of this invention is to provide a method which employs a solvating medium to efficiently demilitarize, extract, and recover ammonium perchlorate in high yield from a solid propellant composition.

Another object of this invention is to employ a solvating medium which has a high solubility for ammonium perchlorate while in a liquified state, but when expanded to its natural gaseous state under reduced or ambient pressure conditions, the solvating medium quantitatively and rapidly releases all solids or liquid materials which were initially retained as the solute of the system thereby making recovery efficient and rapid.

SUMMARY OF THE INVENTION

Propellant demilitarization is achieved by an environmentally safe and efficient method to comminute and remove propellant ingredients from existing rocket motor hardware. The method is applicable to both solid and ground composite propellant samples which are primarily comprised of an inorganic oxidizing salt, aluminum powder, and ester plasticized polybutadiene crosslinked polymers.

High pressure anhydrous liquid ammonia is used as the solvating medium to extract and recover ammonium perchlorate oxidizer or other soluble ingredients from composite propellants. The liquid ammonia is employed to jet spray the surface of a rocket motor propellant grain to erode or reduce the propellant to minute particles. The inorganic oxidizer salt is solubilized in the ammonia while other undissolved propellant ingredients are retained in the form of a slurry for continuous removal by filtration.

To maintain ammonia in liquid state throughout the propellant removal process, the internal gas pressure within the rocket motor must be greater than that of the vapor pressure of ammonia at the established demilitarization temperature. Maintenance of system specific operating pressures are achieved by appropriate gas regulation. A vapor pressure versus temperature curve in FIG. 2 of the Drawing shows the relatively low pressures required to maintain ammonia at liquid operating conditions. If operating pressures within the rocket motor fall below the vapor pressure of ammonia, the liquid ammonia will undergo a phase change to the gaseous state and be ineffective for propellant communition. Following extraction and dissolution of the ammonium perchlorate, the slurry mix is filtered to separate the insoluble aluminum and binder substrates from the liquid ammonia. The liquid ammonia solvent is directed into pressure and temperature controlled collection (separation) chambers to initiate recovery of the dissolved ammonium perchlorate. (Depending on system design and efficiency requirements of the extraction, filtration, and collection units, one or even several processing chambers may be employed.) As the liquid ammonia solvent enters the expansion chamber(s), it undergoes pressure reduction and a liquid-to-gas phase change which forces automatic precipitation of all dissolved ammonium perchlorate. The released gaseous ammonia is subsequently passed through suitable drying columns to remove residual amounts of moisture. The pure, regenerated anhydrous ammonia is recompressed and returned into the extraction system to form a continuous recycling process.

DESCRIPTION OF THE PREFERRED EMBODIMENT

Liquid ammonia is employed under a predetermined pressure and temperature as the solvating medium to demilitarize and efficiently extract and recover ammonium perchlorate oxidizer from a solid composite propellant.

The high solubility of ammonium perchlorate in ammonia (e.g., 139.93 grams per 100 grams of ammonia at 25° C.) is particularly beneficial to this method because of the high levels of this oxidizer, typically 70 to 90 weight percent found in composite propellants. Fine particulate comminution of the propellant grain results in high ammonium perchlorate extraction efficiencies and rapid motor demilitarizations. Liquid ammonia under high pressures erodes the propellant grain and immediately begins to dissolve the ammonium perchlorate oxidizer; a slurry mixture is produced which contains the other residual propellant ingredients as insoluble substances. Typically, these insoluble substances are primarily comprised of fine aluminum powder (10 to 20 weight percent), and plasticized propellant binder (10 to 15 weight percent). To assure continuous slurry removal from the rocket motor, a positive pressure differential may be established between the motor vessel and a slurry holding tank where any undissolved ammonium perchlorate undergoes final dissolution from the insoluble propellant ingredients.

Figure 1:
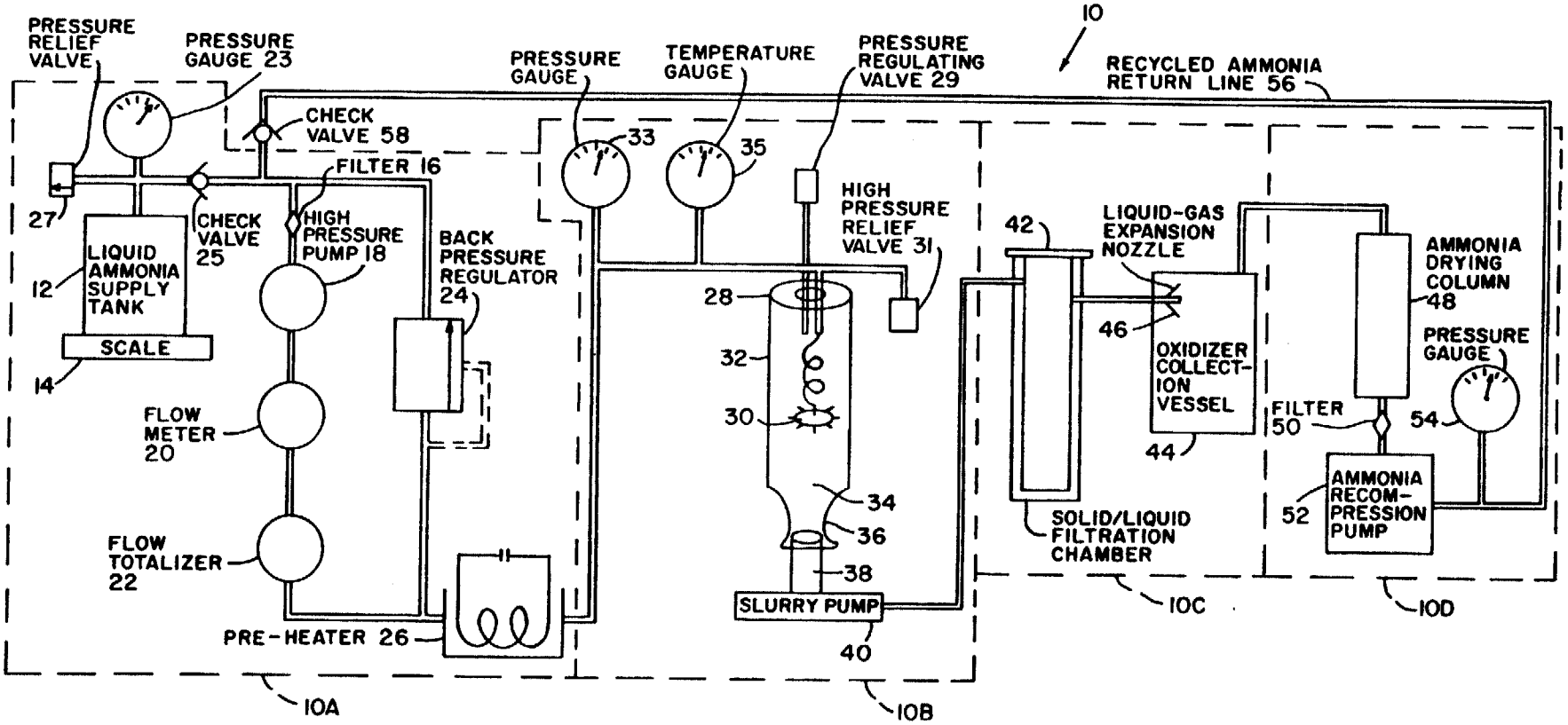
FIG. 1 depicts a liquid ammonia demilitarization unit for recovering solid inorganic oxidizer salt.
Figure 2:
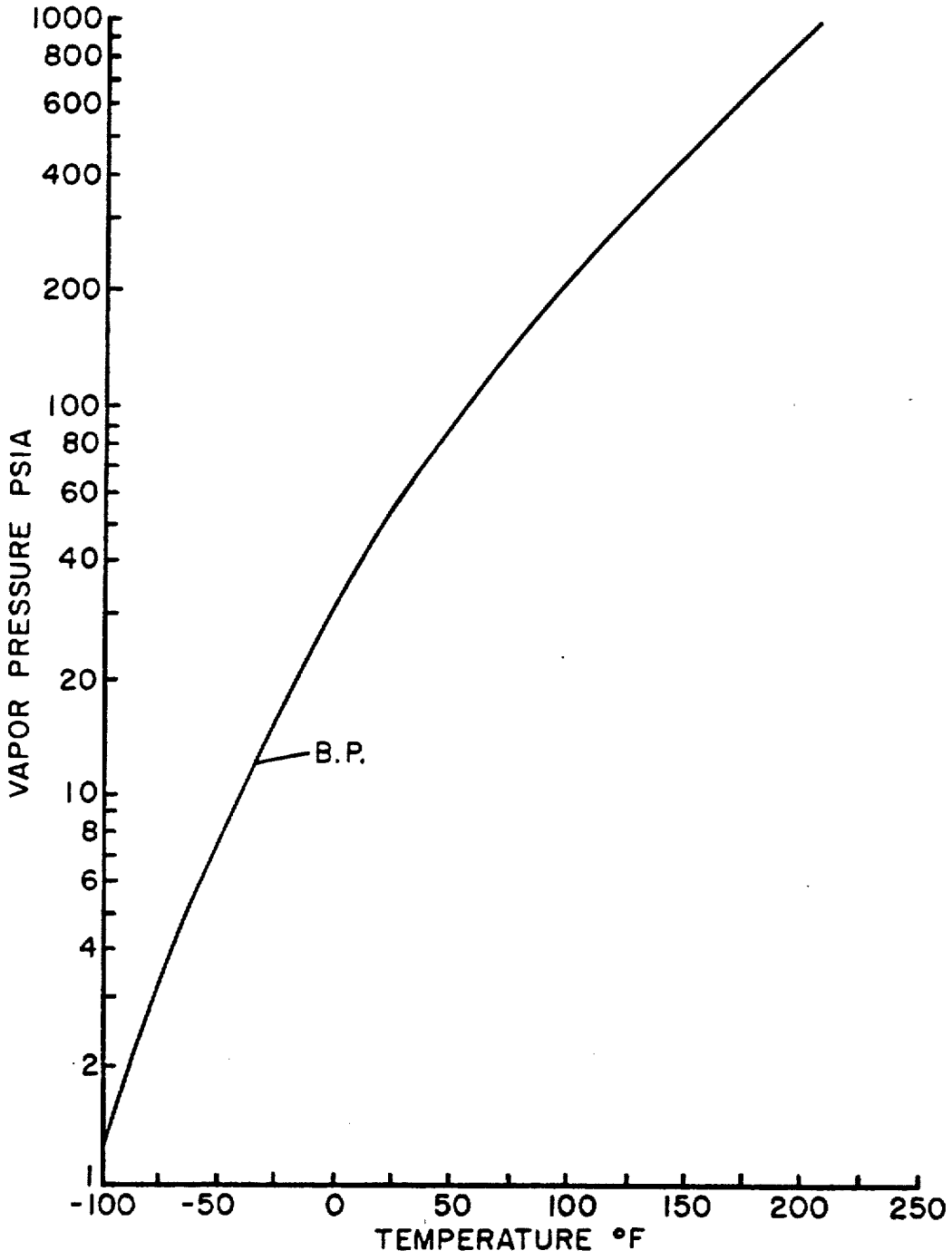
FIG. 2 depicts a vapor pressure versus temperature curve for ammonia.

Refer to FIG. 1 of the drawing which depicts a liquid ammonia demilitarization unit employed in the method of this invention. The method of this invention utilizes a demilitarization unit 10 comprising a supply and high pressure spray system for liquid ammonia 10A, an extraction system 10B, oxidizer recovery system 10C, and an ammonia recovery, drying, and recycling system 10D. As illustrated in FIG. 1, system 10A comprises a liquid ammonia supply tank 12, which is provided with a scale 14 to monitor liquid ammonia reserve capacity, and accessory items including an in-line filter 16, in-line high pressure pump 18, flow meter 20, flow totalizer 22, back pressure regulator 24, and preheater 26. A check valve 25, a pressure gauge 23, and a high pressure safety relief valve 27 are provided for system 10A for controlling the direction of flow and monitoring the supply pressure of the liquid ammonia.

In further reference to FIG. 1 of the drawing, system 10B comprises an extraction system wherein a rocket motor 28 including a rocket motor case with a nozzle portion attached at the aft end thereof. The rocket motor serves as the extraction pressure vessel. The pre-heated, if desired, and pressurized liquid ammonia is discharged from a spinning (or a conventionally arranged multijet type) spray nozzle 30 (provided with an up/down displacement) to erode the propellant 32 from within the rocket motor case to accumulate a slurry 34 in the nozzle portion 36 of rocket motor 28 which is positioned with the nozzle portion in the downward position. A suitable piping member with a seal fitting 38 to rocket nozzle 36 leads to a slurry pump 40 which transfers the resulting liquid ammonia propellant slurry to system 10C. A pressure regulating valve 29, a high pressure relief valve 31, a pressure gauge 33, and a temperature gauge 35 are provided to adjust pressure and monitor the pressure and temperature within the selected temperature pressure range for liquid ammonia extraction for system 10B.

System 10C, as depicted in FIG. 1, includes a solid/-liquid filtration chamber 42 which separates propellant ingredients not solubilized in liquid ammonia. This portion constitutes a relatively small amount of the propellant since a major portion of the propellant is the oxidizer salt (ammonium perchlorate or other soluble inorganic oxidizer salt, typically from about 70 to about 90 weight percent of composite propellant). The liquid ammonia from filtration chamber 42 is transferred on a continuous basis to an oxidizer separator vessel 44 wherein the liquid-gas expansion nozzle 46 achieves gasification of the liquid ammonia ($NH_3$) thereby causing the dissolved ammonium perchlorate (AP) to drop out of solution since the AP is not soluble in gaseous $NH_3$. The gaseous $NH_3$ is then passed through an ammonia drying column 48, then a filter 50, and subsequently to an ammonia recompression pump 52 wherein the pressure is monitored by pressure gauge 54 for the recycled ammonia returned to system 10A through return line 56. A check valve 58 is positioned in return line 56 just prior to the return line connection to system 10A piping which is in communication with liquid ammonia supply tank 12 filter 16, and high pressure pump 18 for return use.

The described method of this invention reveals certain advantages, and other inherent advantages are recognized; however, it appears that a summation of these advantages as compared with the disadvantages of the water extraction method focuses further attention to this method for the recovery of AP from scrap or solid propellant which is no longer usable. Applicants' invention provides a method to efficiently extract and recover ammonium perchlorate from solid, composite propellants without the attendant problems associated with copious amounts of hazardous waste water generation and treatment. Also, as a direct consequence of the quantitative extraction of ammonium perchlorate from these propellants, the method described by this invention avoids the hazard and environmental impacts typically associated with the open burning of large quantities of rocket motor propellants. In addition, the described method allows for the recovery of rocket motor hardware components as a normal consequence of this non-destructive demilitarization process.

Liquid ammonia, as a demilitarizing solvent, has several distinct advantages over the use of liquid water. These benefits include the following: (1) Liquid ammonia possesses nearly a seven fold greater solvating capacity for ammonium perchlorate than water. Specifically, at 25° C. the solubility of ammonium perchlorate in liquid ammonia is 137.93 grams per 100 grams of ammonia versus only 20.0 grams per 100 grams of water. The behavior of ammonium perchlorate in liquid ammonia and water is similar in that each of these solvents is highly polar and are chemically nonreactive towards ammonium perchlorate. The often quoted adage of "likes dissolve likes" is particularly applicable here when considering the enhanced solubility characteristics of ammonium salts, such as ammonium perchlorate and ammonium nitrate, in liquid ammonia solvent. (2) Liquified ammonia, when expanded to its natural gaseous state under reduced or ambient pressure conditions, quantitatively and rapidly releases all solid or liquid materials which may have been dissolved in the liquid ammonia. This "controlled automatic precipitation" aspect makes the use of liquid ammonia an ideal solvent for avoiding the generation of copious amounts of contaminated liquid effluents typically associated with water jet cutting and extraction/recovery methods. (3) In contrast to traditional water jet cutting or ammonium perchlorate extraction processes, the method described herein is particularly suited to the continuous recycling of the liquid ammonia solvent used to demilitarize composite propellants. For example, ammonia is a liquified gas under its own vapor pressure of 114 psig at 70° F. (21.1° C.). When used in this liquified form to extract ammonium perchlorate or other similar ammonium salts from composite propellants, the liquid ammonia and extracted materials are directed to a separation vessel where the pressure is reduced by volume expansion to less than that of the vapor pressure of ammonia. Under reduced pressure, the liquified ammonia undergoes a phase change to the gaseous state whereupon any dissolved solid or liquid materials are precipitated and collected. The resulting gaseous ammonia is readily recompressed and recycled through the extraction system for further use. It is this repetitive extraction, expansion, and recompression type system which makes this method uniquely different from water-based systems. Applicants' invention teaches the unique solute extraction and collection aspects of their demilitarization method, not recognized by the prior art, but brought to life and taken advantage of in their new use for ammonia whose technology base is well established in another art as one of the oldest applications of ammonia as a commercial refrigerant. (4) Further benefits resulting from this method are derived from the advantage of conducting the demilitarization procedure at or around ambient conditions. The solubility of ammonium perchlorate is sufficiently high in liquid ammonia at ambient temperature to preclude the need for elevated operating temperatures. Nevertheless, increased temperatures would tend to further enhance the extraction efficiency of the system. Through appropriate control of the system's operating temperatures and pressures, ammonium perchlorate oxidizer of a desired purity can be achieved during the gas expansion (cooling) and particle collection cycles. The resulting ammonium perchlorate precipitated in the collection vessel can be prepared in a form which is dry, pure, and suitable for repackaging and re-use in propellant. If required for other use, a controlled purification process can be made an integral part of the liquid-to-gas expansion process, and the particle collection cycle also can provide a direct method to "automatically precipitate and chemically grind" solid oxidizer particles to a predetermined, uniform size and configuration. Solute purification techniques of the types implied herein are well established laboratory and commercial procedures and are based on practical applications of solubility characteristics under various temperature and pressure conditions. (5) A problem associated with high pressure water jet spraying of propellant to demilitarize the propellant is the formation of copius quantities of hazardous waste water effluents. Subsequent water purification and reclamation processes are capital equipment intensive, energy inefficient, and expensive. Waste water effluents, which are typically associated with traditional water-based demilitarization procedures, are totally avoided where recovery is accomplished with liquid ammonia in accordance with applicants' method.

Applicants determined the feasibility of their method by completing experiments at the laboratory scale to determine the effectivness of liquid ammonia to extract ammonium perchlorate from composite propellants. Propellants examined are representative of those found in large rocket motors such as the Multiple Launch Rocket System, PERSHING II, and Space Shuttle booster. Quantitative tests were performed under static conditions where known amounts of liquid ammonia were introduced into stainless [still] *steel* extractor vessels containing composite propellants or their individual ingredients. Extractions were conducted under ambient conditions and the natural vapor pressure of liquid ammonia. Anhydrous ammonia was transferred from lecture bottles to extraction vessels that had been cooled with dry ice. Extractions were performed on both solid and ground composite propellant samples which were primarily comprised of ammonium perchlorate, aluminum powder, and ester plasticized hydroxyl- and carboxyl- terminated polybutadiene crosslinked polymers, HTPB and CTBB, respectively. The liquid ammonia extractions of ammonium perchlorate generally were observed to proceed with 100% efficiency in neat, ground, and bulk propellant samples. Extraction times for ammonium perchlorate were determined to be a function of sample configuration where bulk samples required longer residence periods to extract all the ammonium perchlorate. Individual experiments showed that in HTPB polymer systems, ammonium perchlorate was the only propellant ingredient that was soluble in liquid ammonia. The remaining ingredients were observed to be nonreactive toward ammonia. Unplasticized crosslinked HTPB polymer only showed evidence of swelling as a result of ammonia absorption. Infrared analyses on neat samples of high molecular weight propellant plasticizers confirmed their chemical inertness towards liquid ammonia during typical extraction periods. Although the HTPB polymer matrix might be expected to undergo slow chemical degradation under prolonged ammonia residence times, infrared analysis showed this did not occur under actual experimental conditions. In contrast to HTPB binder systems, CTPB polymers were observed to become partially degraded into an amorphous, sticky mass. IR analyses confirmed chemical disruption of the polymer crosslink network. The observed CTPB degradation is not anticipated to pose any additional hazard or major modifications to the demilitarization process described. Typical experimental data for propellant extractions and any interactions of liquid ammonia with propellant ingredients are set forth hereinbelow under experimental conclusions and in Table I and Table II.

Experimental results on the individual composite propellant ingredients show that AP is the only major ingredient that is soluble in anhydrous ammonia. Except for CTPB polymer degradation, the remaining propellant ingredients were observed to be chemically inert under experimental conditions of approximately 30 minutes exposure to anhydrous liquid ammonia.

The basis for the above conclusions are supported by the data of Tables I and II below. Table I lists typical liquid ammonia extraction of AP from HTPB ground composite propellant.

TABLE I

TYPICAL LIQUID AMMONIA EXTRACTION OF AP FROM GROUND HTPB COMPOSITE PROPELLANT

| MASS PROPELLANT | MASS AP EXTRACTED | % AP IN PROPELLANT | % AP EXTRACTED | EXTRACTION EFFICIENCY |
|---|---|---|---|---|
| 0.2132 g | 0.1469 g | 69.0 | 68.9 | 99.9% |

Table II summarizes typical interaction experiments which indicate that no interactions between liquid ammonia and typical HTPB propellant ingredients other than AP, takes place. Occurance of chemical reaction was based on infrared spectral infrared spectral analyses before and after liquid ammonia treatment.

TABLE II

INTERACTION OF LIQUID AMMONIA WITH INDIVIDUAL COMPOSITE PROPELLANT INGREDIENTS AND CTPB PROPELLANT

| INGREDIENT | MASS BEFORE EXTRACTION | MASS AFTER EXTRACTION | RESULTS |
|---|---|---|---|
| Dioctylsebacate | 0.2376 g | 0.2366 g | No extraction; No chemical degradation |
| Dioctyladipate | 0.1250 g | 0.1370 g a | No extraction; No chemical degradation |
| Aluminum Power | 0.2003 | 0.2007 | No extraction; No chemical degradation |
| Polymer Gumstock (Hydroxyl-Terminated Polybutadiene + Isocyante) | 0.2264 | 0.2278 | No extraction; no chemical degradation; only swelling observed due to $NH_3$ absorption |
| Carboxyl-terminated (CTPB) Composite Propellant | b | b | Chemical degradation of CTPB polymer; residual sticky mass; AP extracted |

a The slight loss of mass of these liquid plasticizers are attributed to $NH_3$ carry-over during pressure release.
b Quantitative AP extraction measurements not conducted.

The propellant demilitarization process described represents an environmentally safe and efficient method to comminute and remove propellant from existing rocket motor hardware. Using available hardware components and existing technology based on currently employed jet spray processes, high pressure liquid ammonia is used to erode the surface of the rocket motor propellant grain as depicted in FIG. 1; however, these skilled in the art will be able to recognize other modifications which fall within the spirit and scope of applicants' method to demilitarize, extract, and recover ammonium perchlorate from composite propellants using liquid ammonia.

We claim:

1. A method to demilitarize, extract, and recover ammonium perchlorate from a solid composite propellant composition using liquid ammonia under pressure, said method comprising:

(i) providing a demilitarization unit which comprises a supply and high pressure spray system for liquid ammonia; an extraction system including an extraction pressure vessel for containing composite propellant to be demilitarized, said extraction pressure vessel in communication with said supply and high pressure spray system for liquid ammonia; an ammonium perchorate oxidizer recovery system in communication with said extraction pressure vessel for receiving a propellant slurry contained in said liquid ammonia; and an ammonia recovery system in communication with said ammonium perchlorate oxidizer recovery system for recovering, drying, and recycling the ammonia recovered to said supply and high pressure spray system after completing recompression of said recovered ammonia;

(ii) placing a quantity of a solid composite propellant composition in said extraction pressure vessel;

(iii) admitting a continuous supply of liquid ammonia through said high pressure spray system, said liquid ammonia impinging upon said solid composite propellant to erode and complete high particulate comminution of said composite propellant in liquid ammonia to form a slurry of said composite propellant in liquid ammonia;

(iv) pumping said slurry into a solid-liquid filtration chamber of said ammonium perchlorate oxidizer recovery system wherein solid composite solids are separated from liquid ammonia solution of said ammonium perchlorate oxidizer;

(v) passing said liquid ammonia solution containing said ammonium perchlorate through a liquid-gas expansion nozzle contained in an oxidizer separation vessel of said ammonium perchlorate recovery system wherein said liquid ammonia is gasified and said ammonium perchlorate oxidizer is released to predetermined particle sizes based on liquid droplet size and rate of pressure change at a specified temperature;

(vi) recovering said ammonia perchlorate oxidizer, and, (vii) passing ammonia gas through a drying column of said ammonia recovery system then through a filter and a recompression pump which pressurizes said ammonia gas for recycling said recovered ammonia gas as liquid ammonia to said supply and high pressure spray system of said demilitarization unit.

2. The method of claim 1 wherein said extraction pressure vessel is in the form of a solid rocket motor which contains a solid composite propellant grain within a rocket motor case, said rocket motor case having an attached nozzle portion at the aft end thereof, and said rocket motor being positioned with said nozzle portion in a downward position, and wherein said high pressure spray system includes a spinning, circumventionally arranged multi-jet type, jet spray nozzle, remotely controlled, and having an up and down displacement action to facilitate said eroding and high particulate comminution of said solid composite propellant grain to effect demilitarization of said solid composite propellant grain and to effect removable of said solid composite propellant grain from said case of said solid rocket motor.

*3. A method to dissolve and recover an ammonium salt from a solid composition containing an ammonium salt selected from the group of ammonium salts consisting of ammonium perchlorate and ammonium nitrate using liquid ammonia under pressure to dissolve said ammonium salt and to recover said ammonium salt during a phase change of said liquid ammonia to precipitate and chemically grind said dissolved ammonium salt, said method comprising:*

*(i) providing an extraction and recovery system which comprises a supply and high pressure spray system for liquid ammonia; an extraction system including an extraction pressure vessel for containing said solid composition to be extracted, said extraction pressure vessel being in communication with said supply and high pressure spray system for liquid ammonia; and an ammonium salt recovery system for receiving a solution of said ammonium salt;*

*(ii) placing a quantity of said solid composition in said extraction vessel;*

*(iii) admitting a continuous supply of liquid ammonia through said high pressure spray system; said liquid ammonia impinging upon said solid composition to form a solution of said ammonium salt in liquid ammonia;*

*(iv) passing said liquid ammonia solution containing said ammonium salt through a liquid-gas expansion nozzle contained in said ammonium salt recovery system wherein said liquid ammonia is gasified and said ammonium salt is precipitated and chemically ground; and,*

*(v) recovering said ammonium salt.*

*4. The method of claim 3 wherein said solid composition placed in said extraction vessel is ammonium perchlorate.*

*5. The method of claim 4 wherein said ammonium perchlorate recovered is of uniform particle sizes and configuration.*

*6. The method of claim 3 wherein said solid composition placed in said extraction vessel is ammonium nitrate.*

*7. The method of claim 6 wherein said ammonium nitrate recovered is of uniform particle sizes and configuration.*

*8. The method of claim 3 wherein said solid composition placed in said extraction vessel is a solid composite propellant composition containing ammonium perchlorate and wherein prior to passing said liquid ammonia solution containing said ammonium perchlorate through a liquid gas expansion nozzle contained in said ammonium salt recovery system solid composite solids are separated from said liquid ammonia solution of said ammonium perchlorate.*

*9. The method of claim 3 wherein said solid composition placed in said extraction vessel is a solid composite propellant composition containing ammonium nitrate and wherein prior to passing said liquid ammonium solution containing said ammonium nitrate through a liquid gas expansion nozzle contained in said ammonium salt recovery system solid composite solids are separated from said liquid ammonia solution of said ammonium nitrate.*

* * * * *